April 5, 1927.  
G. F. COLEY  
RADIUS ROD ATTACHMENT  
Filed May 14, 1925
1,623,046
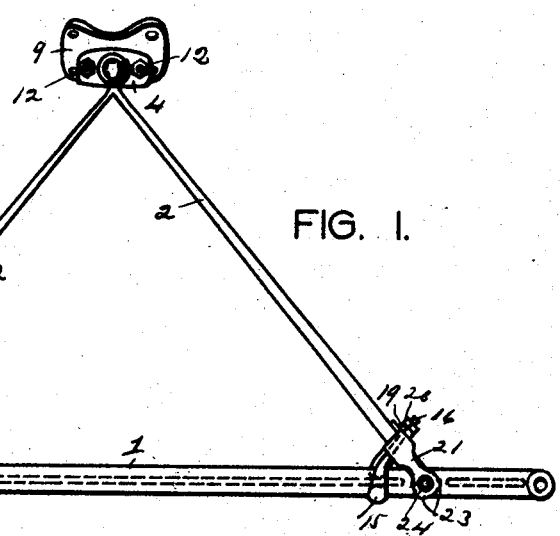
FIG. 1.
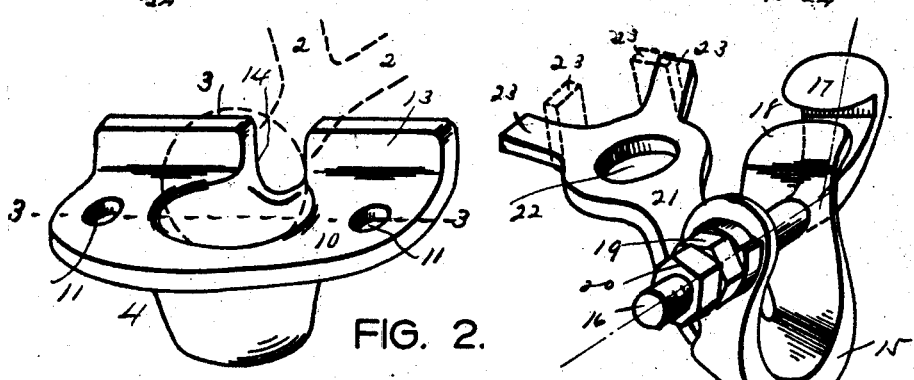
FIG. 2.
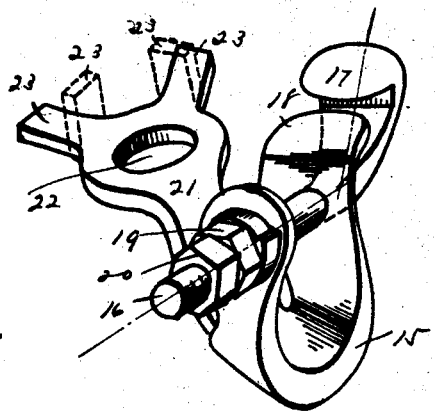
FIG. 4.
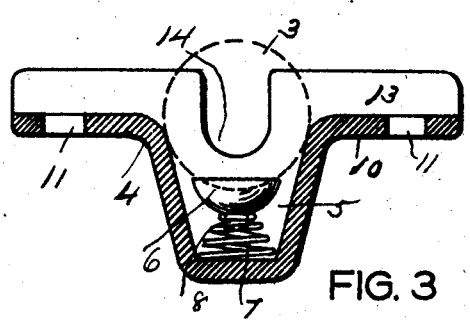
FIG. 3
FIG. 5.
INVENTOR.  
George F. Coley  
BY  
E. K. Bond  
ATTORNEY.

Patented Apr. 5, 1927.

1,623,046

UNITED STATES PATENT OFFICE.

GEORGE F. COLEY, OF OKLAHOMA CITY, OKLAHOMA, ASSIGNOR TO AMERICAN SPECIALTY CO., OF OKLAHOMA CITY, OKLAHOMA, A CORPORATION.

RADIUS-ROD ATTACHMENT.

Application filed May 14, 1925. Serial No. 30,204.

This invention relates to certain new and useful improvements in means for securing the radius rod of a motor vehicle, and while especially designed for use in connection with the style of cars known as the "Ford", it will be evident that the invention to be hereinafter described is not limited to such style of cars.

The present invention has for its objects among others to provide simple, yet efficient, means for this purpose readily applied, not requiring skilled labor, and which will serve as an antirattler. The construction is such that the front axle is held in proper position while the keeper which serves to secure the nut in place prevents the radius rod from bcoming loose and rattling, while the lower socket plate with shoulders prevents the ball from pulling out of place, thus making it more secure. The parts are so co-related as to work in unison, thus making the device capable of performing its functions in the best manner, all the parts cooperating to produce the unitary end.

Other objects and advantages of the invention will hereinafter appear, and the novel features thereof will be specifically defined by the appended claims.

The invention, in its preferred form, is clearly illustrated in the accompanying drawings, which, with the numerals of reference marked thereon, form a part of this specification, and in which—

Figure 1 is a bottom plan view of the axle of a car with my improvements applied thereto.

Figure 2 is an enlarged perspective view of the device for securing the radius rod to the engine, and the anti-rattler.

Figure 3 is a vertical section as on the line 3—3 of Figure 2.

Figure 4 is a perspective view, on an enlarged scale, of the means for securing the radius rod to the axle.

Figure 5 is a fragmentary perspective, with a portion broken away, showing a modified form of keeper.

Like numerals of reference indicate like parts throughout the several views.

Referring to the drawings—

1 designates the axle of a motor vehicle, such as the Ford, and 2 the radius rod. 3 is the ball formed on the rear of the said radius rod, at the angle thereof, as seen in Figure 1.

These parts are of usual and well known construction. In practice this ball has considerable wear in the ball and socket joint in which it is disposed, and causes a rattle that is most objectionable. Furthermore, if not soon repaired the ball pulls out of the socket as now constructed, with detrimental results. In order to overcome this objection and hence to increase the wear and usefulness of these parts, I provide a stamped lower socket plate 4 with a socket 5 of somewhat greater depth than the diameter of the ball, and within this socket I place a washer or the like 6, preferable dish-shaped, as shown in Figure 3, and mount this washer upon a spring 7 resting upon the bottom of the socket as seen in Figure 3. The member 6 may if desired have a depending projection 8 to engage within the spring tending to steady the movement of the latter, as seen in Figure 3. This serves to at all times keep the ball tight against the cooperating socket plate 9. The socket plate 4 is formed with a flange 10 having holes 11, for the reception of the means 12 which secure it to the plate 9, as seen in Figure 1.

The plate 4 is formed with an upstanding flange 13 having a cut-away portion or opening 14 to keep the ball from pulling out, it being understood that the movement of the radius rod is up and down and twisting, but never from side to side.

As seen in Figure 3 the washer or member 6 is of materially less diameter than the socket so that the said member is free to rock and thus readily accomodate itself to the varying motions of the rod.

In Figure 1, I have shown the radius rod secured to the axle by novel means consisting of a stamped clevis 15 the pin 16 of which is provided at one end with a hook 17, the adjacent end of the clevis plate or member being extended as seen at 18 to grip the lower web of the axle 1 and to be tightened in place by the nut 19 and lock nut 20 on the threaded portion of the pin 16, as seen clearly in Figure 4.

21 is a keeper having an opening 22 by which it may be slipped over the collar of the nut and with lugs 23 adapted to be bent as shown by dotted lines in Figure 4 to prevent turning and displacement. The bolt on which the nut 24 is screwed serves to hold the end of the radius rod to the axle as seen in Figure 1.

In Figure 5, I have shown a modified form of the keeper portion 25 the opening 26 therein being provided with the lugs 27 to serve to keep the nut 24 locked against turning.

Other forms of keepers may be employed without departing from the primary object thereof, and various other modifications in detail of construction, etc., may be resorted to without departing from the spirit of the invention or sacrificing any of its advantages.

What is claimed as new is:—

1. A radius rod attaching means comprising a socket plate with a ball-receiving socket, a resilient rockable support for the ball in said socket, depending means on the socket engaged with said support and means for preventing displacement of the radius rod.

2. A radius rod attaching means embodying a socket plate with a depression, and a flange with a recess, a cup-shaped member in said depression, to receive the ball of the radius rod, and a spring in said depression upon which the said cup-shaped member rests with freedom of rocking movement.

3. In a radius rod attaching means, a socket plate with a rockable resilient device for receiving the ball of the radius rod, means for steadying the resilient support of said device, a clevis with attaching means, and a keeper for cooperation therewith.

In testimony whereof I affix my signature.

GEORGE F. COLEY.